(12) United States Patent
Opastrakoon et al.

(10) Patent No.: US 11,507,304 B1
(45) Date of Patent: Nov. 22, 2022

(54) DIAGONAL PAGE MAPPING IN MEMORY SYSTEMS

(71) Applicant: MICRON TECHNOLOGY, INC., Boise, ID (US)

(72) Inventors: Tawalin Opastrakoon, Boise, ID (US); Renato C. Padilla, Folsom, CA (US); Michael G. Miller, Boise, ID (US); Christopher M. Smitchger, Boise, ID (US); Gary F. Besinga, Boise, ID (US); Sampath K. Ratnam, San Jose, CA (US); Vamsi Pavan Rayaprolu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/339,660

(22) Filed: Jun. 4, 2021

(51) Int. Cl.
*G06F 12/00* (2006.01)
*G06F 3/06* (2006.01)

(52) U.S. Cl.
CPC .......... *G06F 3/0655* (2013.01); *G06F 3/0619* (2013.01); *G06F 3/0679* (2013.01); *G06F 3/0689* (2013.01)

(58) Field of Classification Search
None
See application file for complete search history.

(56) References Cited

U.S. PATENT DOCUMENTS

| 8,694,849 | B1* | 4/2014 | Micheloni | H03M 13/2906 |
| | | | | 714/753 |
| 2010/0268876 | A1* | 10/2010 | Reid | G06F 3/0604 |
| | | | | 711/E12.001 |
| 2019/0146906 | A1* | 5/2019 | Gholamipour | G06F 3/0689 |
| | | | | 711/103 |
| 2019/0303008 | A1* | 10/2019 | Bennett | G06F 3/0689 |

\* cited by examiner

*Primary Examiner* — Daniel D Tsui
(74) *Attorney, Agent, or Firm* — Lowenstein Sandler LLP

(57) ABSTRACT

A plurality of host data items, including a first host data item and a second host data item, are received. The second host data item consecutively follows the first host data item. The first host data item is stored in a first page of a first logical unit of the memory device, wherein the first page is associated with a first page number. A second page number is determined for the second host data item based on an offset value that corresponds to a number of pages per wordline of the memory device. A second logical unit of the memory device is identified. The second host data item is stored in a second page of the second logical unit, wherein the second page is identified by the second page number, and the first page and the second page are associated with a fault-tolerant stripe.

20 Claims, 10 Drawing Sheets

300A

| | Logical unit 302A | Logical unit 302B | Logical unit 302C | Logical unit 302D |
|---|---|---|---|---|
| | LUN 0 | LUN 1 | LUN 2 | LUN 3 |
| | Block 306A | Block 306B | Block 306C | Block 306D |
| | Block A (#0) | Block B (#1) | Block C (#2) | Block D (#3) |
| Word Line 0 314A | Page 0 (Item 0) — Page 310A | Page 0 (unused) | Page 0 (unused) | Page 0 (unused) |
| | | Page 1 (unused) | Page 1 (unused) | Page 1 (unused) |
| | | Page 2 (unused) | Page 2 (unused) | Page 2 (unused) |
| | | Page 3 (unused) | Page 3 (unused) | Page 3 (unused) |
| Word Line 1 314B | | Page 4 (Item 1) — Page 310B (Offset=4) | Page 4 (unused) | Page 4 (unused) |
| | | | Page 5 (unused) | Page 5 (unused) |
| | | | Page 6 (unused) | Page 6 (unused) |
| | | | Page 7 (unused) | Page 7 (unused) |
| Word Line 2 314C | | | Page 8 (Item 2) — Page 310C (Offset=4) | Page 8 (unused) |
| | | | | Page 9 (unused) |
| | | | | Page 10 (unused) |
| | | | | Page 11 (unused) |
| Word Line 3 314D | | | | Page 12 (Item 3) — Page 310D (Offset=4) |

| | LUN 0 | LUN 1 | LUN 2 | LUN 3 |
|---|---|---|---|---|
| | Block A (#1) | Block B (#2) | Block C (#3) | Block D (#4) |
| Word Line 0 | Page 0 (stripe 0) | Page 0 (unused) | Page 0 (unused) | Page 0 (unused) |
| | Page 1 (stripe 1) | Page 1 (unused) | Page 1 (unused) | Page 1 (unused) |
| | Page 2 (stripe 2) | Page 2 (unused) | Page 2 (unused) | Page 2 (unused) |
| | Page 3 (stripe 3) | Page 3 (unused) | Page 3 (unused) | Page 3 (unused) |
| Word Line 1 | Page 4 (stripe 4) | Page 4 (stripe 0) | Page 4 (unused) | Page 4 (unused) |
| | Page 5 (stripe 5) | Page 5 (stripe 1) | Page 5 (unused) | Page 5 (unused) |
| | Page 6 (stripe 6) | Page 6 (stripe 2) | Page 6 (unused) | Page 6 (unused) |
| | Page 7 (stripe 7) | Page 7 (stripe 3) | Page 7 (unused) | Page 7 (unused) |
| Word Line 2 | Page 8 (stripe 8) | Page 8 (stripe 4) | Page 8 (stripe 0) | Page 8 (unused) |
| | Page 9 (stripe 9) | Page 9 (stripe 5) | Page 9 (stripe 1) | Page 9 (unused) |
| | Page 10 (stripe 10) | Page 10 (stripe 6) | Page 10 (stripe 2) | Page 10 (unused) |
| | Page 11 (stripe 11) | Page 11 (stripe 7) | Page 11 (stripe 3) | Page 11 (unused) |
| Word Line 3 | Page 12 (stripe 12) | Page 12 (stripe 8) | Page 12 (stripe 4) | Page 12 (stripe 0) |
| | Page 13 (stripe 13) | Page 13 (stripe 9) | Page 13 (stripe 5) | Page 13 (stripe 1) |
| | Page 14 (stripe 14) | Page 14 (stripe 10) | Page 14 (stripe 6) | Page 14 (stripe 2) |
| | Page 15 (stripe 15) | Page 15 (stripe 11) | Page 15 (stripe 7) | Page 15 (stripe 3) |

| | LUN 0 | LUN 1 | LUN 2 | LUN 3 |
|---|---|---|---|---|
| | Block E | Block F | Block G | Block H |
| Word Line 0 | Page 0 (stripe 16) | Page 0 (stripe 12) | Page 0 (stripe 8) | Page 0 (stripe 4) |
| | Page 1 (stripe 17) | Page 1 (stripe 13) | Page 1 (stripe 9) | Page 1 (stripe 5) |
| | Page 2 (stripe 18) | Page 2 (stripe 14) | Page 2 (stripe 10) | Page 2 (stripe 6) |
| | Page 3 (stripe 19) | Page 3 (stripe 15) | Page 3 (stripe 11) | Page 3 (stripe 7) |
| Word Line 1 | Page 4 (stripe 20) | Page 4 (stripe 16) | Page 4 (stripe 12) | Page 4 (stripe 8) |
| | Page 5 (stripe 21) | Page 5 (stripe 17) | Page 5 (stripe 13) | Page 5 (stripe 9) |
| | Page 6 (stripe 22) | Page 6 (stripe 18) | Page 6 (stripe 14) | Page 6 (stripe 10) |
| | Page 7 (stripe 23) | Page 7 (stripe 19) | Page 7 (stripe 15) | Page 7 (stripe 11) |
| Word Line 2 | Page 8 (stripe 24) | Page 8 (stripe 20) | Page 8 (stripe 16) | Page 8 (stripe 12) |
| | Page 9 (stripe 25) | Page 9 (stripe 21) | Page 9 (stripe 17) | Page 9 (stripe 13) |
| | Page 10 (stripe 26) | Page 10 (stripe 22) | Page 10 (stripe 18) | Page 10 (stripe 14) |
| | Page 11 (stripe 27) | Page 11 (stripe 23) | Page 11 (stripe 19) | Page 11 (stripe 15) |
| Word Line 3 | Page 12 (stripe 28) | Page 12 (stripe 24) | Page 12 (stripe 20) | Page 12 (stripe 16) |
| | Page 13 (stripe 29) | Page 13 (stripe 25) | Page 13 (stripe 21) | Page 13 (stripe 17) |
| | Page 14 (stripe 30) | Page 14 (stripe 26) | Page 14 (stripe 22) | Page 14 (stripe 18) |
| | Page 15 (stripe 31) | Page 15 (stripe 27) | Page 15 (stripe 23) | Page 15 (stripe 19) |

| | | LUN 0 | LUN 1 | LUN 2 | LUN 3 |
|---|---|---|---|---|---|
| | | Block A (#1) | Block B (#2) | Block C (#3) | Block D (#4) |
| Word Line 0 | Page 0 | Item 0 (stripe 0) | (unused) | (unused) | (unused) |
| | Page 1 | Item 4 (stripe 1) | (unused) | (unused) | (unused) |
| | Page 2 | Item 8 (stripe 2) | (unused) | (unused) | (unused) |
| | Page 3 | Item 12 (stripe 3) | (unused) | (unused) | (unused) |
| Word Line 1 | Page 4 | Item 16 (stripe 4) | Item 1 (stripe 0) | (unused) | (unused) |
| | Page 5 | Item 20 (stripe 5) | Item 5 (stripe 1) | (unused) | (unused) |
| | Page 6 | Item 24 (stripe 6) | Item 9 (stripe 2) | (unused) | (unused) |
| | Page 7 | Item 28 (stripe 7) | Item 13 (stripe 3) | (unused) | (unused) |
| Word Line 2 | Page 8 | Item 32 (stripe 8) | Item 17 (stripe 4) | Item 2 (stripe 0) | (unused) |
| | Page 9 | Item 36 (stripe 9) | Item 21 (stripe 5) | Item 6 (stripe 1) | (unused) |
| | Page 10 | Item 40 (stripe 10) | Item 25 (stripe 6) | Item 10 (stripe 2) | (unused) |
| | Page 11 | Item 44 (stripe 11) | Item 29 (stripe 7) | Item 14 (stripe 3) | (unused) |
| Word Line 3 | Page 12 | Item 48 (stripe 12) | Item 33 (stripe 8) | Item 18 (stripe 4) | Item 3 (stripe 0) |
| | Page 13 | Item 52 (stripe 13) | Item 37 (stripe 9) | Item 22 (stripe 5) | Item 7 (stripe 1) |
| | Page 14 | Item 56 (stripe 14) | Item 41 (stripe 10) | Item 26 (stripe 6) | Item 11 (stripe 2) |
| | Page 15 | Item 60 (stripe 15) | Item 45 (stripe 11) | Item 30 (stripe 7) | Item 15 (stripe 3) |

| | | LUN 0 | LUN 1 | LUN 2 | LUN 3 |
|---|---|---|---|---|---|
| | | Block E (#4) | Block F (#5) | Block G (#6) | Block H (#7) |
| Word Line 0 | Page 0 | Item 64 (stripe 16) | Item 49 (stripe 12) | Item 34 (stripe 8) | Item 19 (stripe 4) |
| | Page 1 | Item 68 (stripe 17) | Item 53 (stripe 13) | Item 38 (stripe 9) | Item 23 (stripe 5) |
| | Page 2 | Item 72 (stripe 18) | Item 57 (stripe 14) | Item 42 (stripe 10) | Item 27 (stripe 6) |
| | Page 3 | Item 76 (stripe 19) | Item 61 (stripe 15) | Item 46 (stripe 11) | Item 31 (stripe 7) |
| Word Line 1 | Page 4 | Item 80 (stripe 20) | Item 65 (stripe 16) | Item 50 (stripe 12) | Item 35 (stripe 8) |
| | Page 5 | Item 84 (stripe 21) | Item 69 (stripe 17) | Item 54 (stripe 13) | Item 39 (stripe 9) |
| | Page 6 | Item 88 (stripe 22) | Item 73 (stripe 18) | Item 58 (stripe 14) | Item 43 (stripe 10) |
| | Page 7 | Item 92 (stripe 23) | Item 77 (stripe 19) | Item 62 (stripe 15) | Item 47 (stripe 11) |
| Word Line 2 | Page 8 | Item 96 (stripe 24) | Item 81 (stripe 20) | Item 66 (stripe 16) | Item 51 (stripe 12) |
| | Page 9 | Item 100 (stripe 25) | Item 85 (stripe 21) | Item 70 (stripe 17) | Item 55 (stripe 13) |
| | Page 10 | Item 104 (stripe 26) | Item 89 (stripe 22) | Item 74 (stripe 18) | Item 59 (stripe 14) |
| | Page 11 | Item 108 (stripe 27) | Item 93 (stripe 23) | Item 78 (stripe 19) | Item 63 (stripe 15) |
| Word Line 3 | Page 12 | Item 112 (stripe 28) | Item 97 (stripe 24) | Item 82 (stripe 20) | Item 67 (stripe 16) |
| | Page 13 | Item 116 (stripe 29) | Item 101 (stripe 25) | Item 86 (stripe 21) | Item 71 (stripe 17) |
| | Page 14 | Item 120 (stripe 30) | Item 105 (stripe 26) | Item 90 (stripe 22) | Item 75 (stripe 18) |
| | Page 15 | Item 124 (stripe 31) | Item 109 (stripe 27) | Item 94 (stripe 23) | Item 79 (stripe 19) |

| | LUN 0 | LUN 1 | LUN 2 | LUN 3 |
|---|---|---|---|---|
| | Block A (#1) | Block B (#2) | Block C (#3) | Block D (#4) |
| Word Line 0 | Page 0 (stripe 0) | Page 0 (unused) | Page 0 (unused) | Page 0 (unused) |
| | Page 1 (stripe 1) | Page 1 (unused) | Page 1 (unused) | Page 1 (unused) |
| | Page 2 (stripe 2) | Page 2 (unused) | Page 2 (unused) | Page 2 (unused) |
| | Page 3 (stripe 3) | Page 3 (unused) | Page 3 (unused) | Page 3 (unused) |
| Word Line 1 | Page 4 (stripe 4) | Page 4 (unused) | Page 4 (unused) | Page 4 (unused) |
| | Page 5 (stripe 5) | Page 5 (unused) | Page 5 (unused) | Page 5 (unused) |
| | | Page 6 (unused) | Page 6 (unused) | Page 6 (unused) |
| | | Page 7 (unused) | Page 7 (unused) | Page 7 (unused) |
| Word Line 2 | | Page 8 (stripe 0) | Page 8 (unused) | Page 8 (unused) |
| | | Page 9 (stripe 1) | Page 9 (unused) | Page 9 (unused) |
| | | Page 10 (stripe 2) | Page 10 (unused) | Page 10 (unused) |
| | | Page 11 (stripe 3) | Page 11 (unused) | Page 11 (unused) |
| Word Line 3 | | Page 12 (stripe 4) | Page 12 (unused) | Page 12 (unused) |
| | | Page 13 (stripe 5) | Page 13 (unused) | Page 13 (unused) |
| | | | Page 14 (unused) | Page 14 (unused) |
| | | | Page 15 (unused) | Page 15 (unused) |

| | LUN 0 | LUN 1 | LUN 2 | LUN 3 |
|---|---|---|---|---|
| | Block E | Block F | Block G | Block H |
| Word Line 0 | | | Page 0 (stripe 0) | Page 0 (unused) |
| | | | Page 1 (stripe 1) | Page 1 (unused) |
| | | | Page 2 (stripe 2) | Page 2 (stripe 6) |
| | | | Page 3 (stripe 3) | Page 3 (unused) |
| Word Line 1 | | | Page 4 (stripe 4) | Page 4 (unused) |
| | | | Page 5 (stripe 5) | Page 5 (unused) |
| | | | | Page 6 (unused) |
| | | | | Page 7 (unused) |
| Word Line 2 | | | | Page 8 (stripe 0) |
| | | | | Page 9 (stripe 1) |
| | | | | Page 10 (stripe 2) |
| | | | | Page 11 (stripe 3) |
| Word Line 3 | | | | Page 12 (stripe 4) |
| | | | | Page 13 (stripe 5) |

Receive a plurality of host data items comprising a first host data item and a second host data item that consecutively follows the first host data item according to an order in which the host data items are received
510

↓

Store the first host data item in a first page of a first logical unit of the memory device, wherein the first page is associated with a first page number
520

↓

Determine a second page number for the second host data item, wherein the second page number is determined based on an offset value that corresponds to a number of pages per wordline of the memory device
530

↓

Identify a second logical unit of the memory device
540

↓ storing the second host data item in a second page of the second logical unit, wherein the second page is identified by the second page number, and the first page and the second page are associated with a fault-tolerant stripe
550

FIG. 5

DIAGONAL PAGE MAPPING IN MEMORY SYSTEMS

TECHNICAL FIELD

Embodiments of the disclosure relate generally to memory sub-systems, and more specifically, relate to diagonal page mapping in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3A schematically illustrates an example diagonal page mapping of a memory device, in accordance with embodiments of the present disclosure.

FIG. 3B schematically illustrates an example diagonal page mapping across multiple blocks of a memory device, in accordance with embodiments of the present disclosure.

FIG. 3C schematically illustrates example data items in an example diagonal page mapping across multiple blocks of a memory device, in accordance with embodiments of the present disclosure.

FIG. 4 schematically illustrates another example diagonal page mapping across multiple blocks of a memory device, in accordance with embodiments of the present disclosure.

FIG. 5 is a flow diagram of an example method of diagonal page mapping by a memory sub-system controller operating in accordance with some embodiments of the present disclosure.

DETAILED DESCRIPTION

Figure 1:
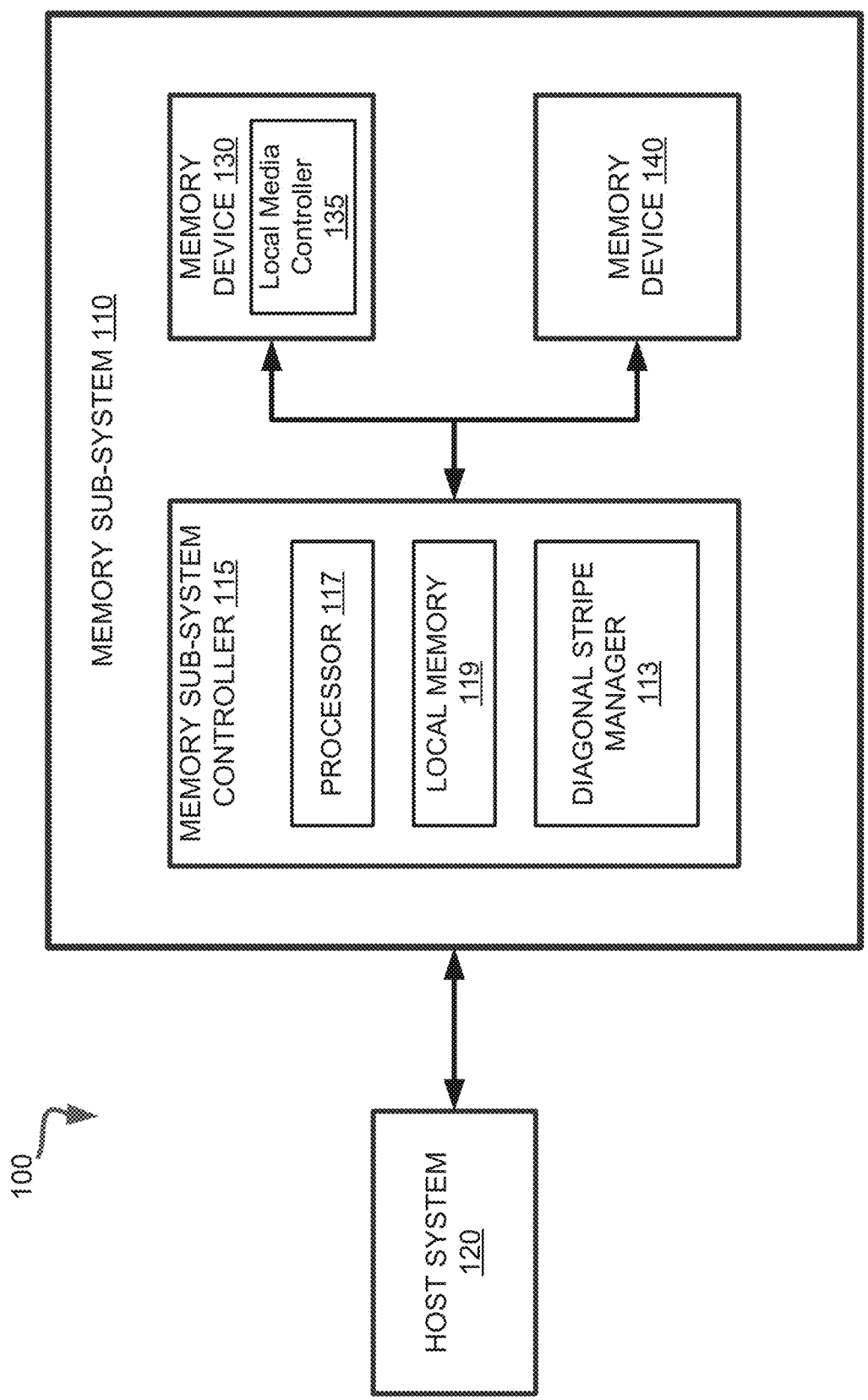
FIG. 1 illustrates an example computing system that includes a memory sub-system in accordance with some embodiments of the present disclosure.

Aspects of the present disclosure are directed to storing data for fault tolerant stripes at locations based on diagonal page mapping in memory sub-systems. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Different memory allocations schemes track different granular sizes of memory, where a common memory allocation is for a superblock, although other sets of pages or super pages can be allocated at different granularities other than a superblock. A superblock is a set of data blocks that span multiple dice that are written in an interleaved fashion. In some cases, a superblock spans all (or at least some of) the dice within a memory device. A superblock can contain multiple data blocks from a single die, such as one per plane. Drives can generally manage the erasure and programming of data on a superblock basis or other granularity of super pages. A super page can be a page programmed to multiple dies. A super page can be a lowest addressable unit of memory.

Various memory sub-systems can implement fault tolerant redundancy schemes, such as a redundant array of independent NAND (RAIN), for error checking and correction. A fault tolerant redundancy scheme can store host data in groups of pages, referred herein as fault tolerant stripes. Each stripe can be associated with or include redundancy metadata. The redundancy metadata can be stored in a page of the stripe (e.g., a parity page), for example, thus enabling the data to be reconstructed if one of the pages of the stripe fails.

A memory device can include multiple arrays of memory cells grouped by wordlines. Failure of the memory device at a particular wordline can result in the data stored at the wordline being at least partially lost. Furthermore, a defect that results in the failure of a particular wordline can further trigger failures of other wordlines that are proximate to that wordline. Thus, a defect can cause the loss of multiple data pages of the fault tolerant stripe at different locations (e.g., at different wordlines). If multiple data pages of the same fault tolerant stripe are located at the same wordline or proximate wordlines, too many host data elements can be lost simultaneously, thus rendering impossible reconstruction of the lost host data elements based on the available redundancy metadata. Accordingly, storing data pages of a fault tolerant stripe at the same wordline or proximate wordlines can cause the loss of data of the fault tolerant stripe in the event of a failure of the memory device.

Further, different wordlines can have different programming times, regardless of whether the wordlines have defects. Such inconsistencies in programming times can be a characteristic of a NAND memory device, for example. Data is ordinarily written to blocks in wordline order, so a wordline that takes substantially more time to program than others can cause the programming time of the block to be higher than that of other blocks. Inconsistencies in block programming times can be undesirable, as some applications can expect uniform block programming times.

Aspects of the present disclosure address the above and other deficiencies by providing a memory sub-system that stores host data items in diagonal stripes. A diagonal stripe can include, for example, a page on each logical unit of a memory device, and each page can be associated with a different wordline of the memory device. The memory sub-system can store consecutively-received host data items on consecutive logical units in pages having page numbers that differ by an offset value. Increasing the page number by the offset value for each successive page on each successive logical unit can generate a diagonal arrangement of pages, since the location of each page of the stripe can change in two dimensions (e.g., across logical units and across wordlines). The diagonal arrangement can be in a logical view, and pages of a diagonal stripe are not necessarily arranged diagonally on the memory device. The offset value can be the number of pages in a wordline, for example. In this way, each host data item of a stripe can be stored in a different wordline. Each logical unit can be, for example, a die. Thus, storing each page of a stripe at a different wordline can cause each page to be stored at a different physical location on each die of the stripe.

For example, if a memory device has four logical units, a diagonal stripe can include a page on each of the logical units. If each wordline contains four pages, then an offset value of 4 pages can be used to store host data in a diagonal stripe in which the page number increases by four for each successive host data item on each successive logical unit. Thus, if the logical units are numbered 0, 1, 2, and 3, then four data items can be stored in a stripe of four pages by storing the four data items at pages 0, 4, 8, and 12, respectively, on respective logical units 0, 1, 2, and 3.

Each stripe can include up to a threshold number of pages. For example, each stripe can include a page on each logical unit, in which case the number of pages that can be stored in a stripe can correspond to the number of logical units in the memory device. As host data items are received, each host data item can be stored in a page of a stripe. When the stripe is full (e.g., a host data item has been stored in each page of the stripe), a new stripe can be created, and host data items can be stored in the new stripe until it is full, and so on. The pages of each stripe can be arranged diagonally as described above, and the page numbers can be incremented by 1 page for each new stripe. Thus, for example, a first stripe can correspond to pages 0, 4, 8, and 12, and a second stripe can correspond to pages 1, 5, 9, and 13 on logical units 0, 1, 2, and 3, respectively.

The pages of a memory device can be stored in blocks, and each block can have capacity to store up to a threshold number of pages per block. Each block can correspond to a logical unit, and multiple blocks can be stored on each logical unit. For example, blocks A, B, C, and D can be stored on logical units 0, 1, 2, and 3, respectively. Each block can have capacity to store 16 pages. When block A is full, additional pages can be stored on the second block of logical unit 0, which can be referred to as block E. Similarly, the second block of logical unit 1 can be block F, the second block of logical unit 2 can be block G, and the second block of logical unit 3 can be block H. Blocks A, B, C, and D can form a first horizontal superblock, and blocks E, F, G, and H can form a second horizontal superblock. A diagonal stripe can thus be stored on multiple horizontal superblocks. As an example, 16 stripes can begin on block A (at pages 0-15), and a 17th stripe can begin on block E (at page 0). Further, since stripes are arranged diagonally, some of the stripes that begin on block A can extend onto one or more of blocks F, G, and H on a second horizontal superblock. If the offset value is 4, for example, a stripe that begins at page 4 of block A can also include page 8 of block B, page 12 of block D, and page 0 of block H (on wordlines 1, 2, and 3, respectively). Page 0 of block H is on wordline 0, so each page of the stripe is on a different wordline.

Advantages of the present disclosure include, but are not limited to, increased tolerance of defects that can occur at the same location on different dies on a memory device. Storing stripes diagonally, such that each data item of a stripe is located at a different wordline location on each logical unit (e.g., die), reduces the probability that multiple pages of a stripe are affected by a defect or other anomaly that occurs in the same area on each logical unit. For example, a wordline can have a defect that prevents storage or retrieval of data. The defect can be present on the same wordline of multiple logical units. Storing stripes diagonally across different wordlines can increase the effectiveness of fault-tolerance techniques that mitigate the negative effects of such defects. If each page of the stripe is stored on a different wordline of each logical unit, then a defect on the same wordline of each logical unit can be tolerated using an error correction technique that can correct errors on one page of the stripe.

Further advantages of the present disclosure include, but are not limited to, increased consistency in programming times of stripes. Some logical units (e.g., dies) can have certain wordlines that take more time to program than other wordlines. This variance in programming time can be a characteristic of certain NAND memory devices, for example. However, in some applications, consistent programming times are desired. If each stripe is stored on a single wordline, then stripes stored on slower wordlines can have longer programing times than stripes stored on other faster wordlines. Distributing each stripe across wordlines as described herein (e.g., diagonally) can reduce the variance in programming times, since each stripe can include pages from faster wordlines and slower wordlines. Reducing the variance can result in storage operations having more consistent latencies.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130. 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

In some implementations, memory sub-system 110 can use a striping scheme, according to which the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "superblock."

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a diagonal stripe manager 113 that manages storing the host data in diagonal stripes. In some embodiments, the memory sub-system controller 115 includes at least a portion of the diagonal stripe manager 113. In some embodiments, the diagonal stripe manager 113 is part of the host system 110, an application, or an operating system. In other embodiments, local media controller 135 includes at least a portion of diagonal stripe manager 113 and is configured to perform the functionality described herein.

The diagonal stripe manager 113 can be employed to implement diagonal strip layouts for storing host data at the memory device 130. As the host data is received, the diagonal stripe manager 113 can program the pages of the memory device to form diagonal stripes. The diagonal stripe manager can determine which pages to program by mapping logical addresses (e.g., addresses of host data items) to physical addresses, such as page numbers, logical unit numbers, and physical block numbers, of pages in diagonal stripes. Alternatively or additionally, diagonal stripe manager 113 can map physical addresses of pages in "horizontal" stripes (e.g., stripes that have the same page number on each logical unit) to physical addresses of pages in diagonal stripes, in which case diagonal stripe manager 113 can be used to translate the output of a page mapping component to generate diagonal stripes. A diagonal stripe can include, for example, a page on each logical unit of a memory device, and each can be on a different wordline of the memory device. The memory sub-system can store consecutively-received host data items on consecutive logical units in pages having page numbers that differ by an offset value. Increasing the page number by the offset value for each successive page on each successive logical unit can generate a diagonal arrangement of pages, since the location of each page of the stripe can change in two dimensions (e.g., across logical units and across wordlines). The diagonal arrangement can be in a logical view, and pages of a diagonal stripe are not necessarily arranged diagonally on the memory device. The offset value can be the number of pages in a wordline, for example. In this way, each host data item of a stripe can be stored in a different wordline. Thus, storing each page of a stripe at a different wordline can cause each page to be stored at a different physical location on each logical unit (e.g., die) of the stripe.

Storing stripes diagonally, such that each data item of a stripe is located at a different wordline location on each logical unit, can result in increased fault tolerance of the memory sub-system. Storing stripes diagonally can reduce the probability that multiple pages of a stripe are affected by a defect or other anomaly that occurs in the same area on each logical unit. Further, some logical units can have certain wordlines that take more time to program than other wordlines. Distributing each stripe across wordlines diagonally can reduce the variance in programming times, since each stripe can include pages from faster wordlines and slower wordlines. Further details with regards to the operations of the diagonal stripe manager 113 are described below.

Figure 2:
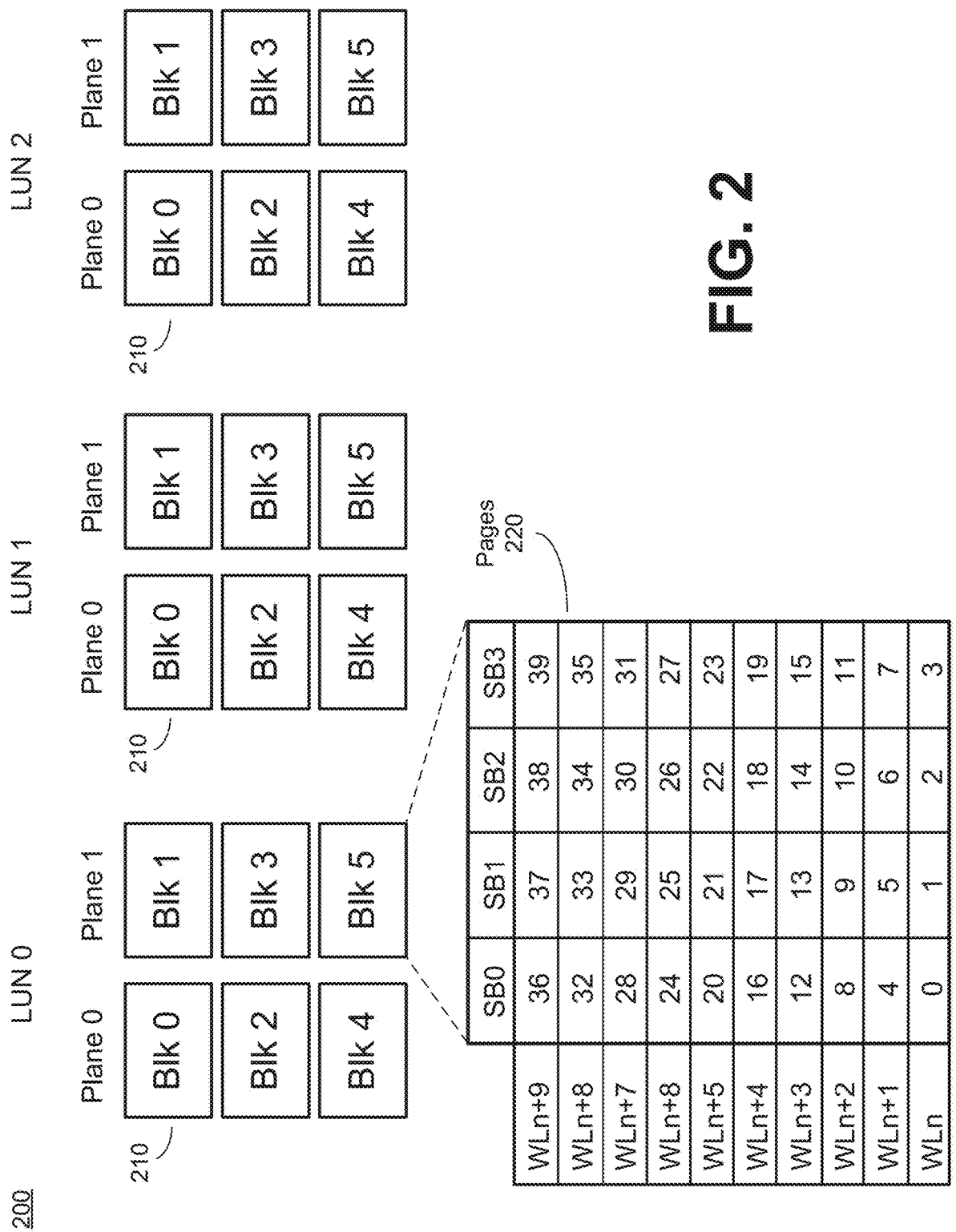
FIG. 2 schematically illustrates an example layout of a memory device, in accordance with embodiments of the present disclosure.

FIG. 2 schematically illustrates an example layout 200 of a memory device, in accordance with embodiments of the present disclosure. As noted herein above and schematically illustrated by FIG. 2, host data can be stored on a memory device, which can include multiple logical units (also referred to as "LUNs" or "dies"). Each logical unit can include multiple blocks 210 that reside on one or more planes. Each block can include multiple pages 220 that are grouped by respective wordlines WLn-WLn+k. Each block can include multiple sub-blocks SB0-SB3, and each sub-block can include multiple pages. Programming and/or erase operations can be simultaneously performed on two or more pages, e.g., if each page resides on a respective plane.

Multiple blocks can be logically combined to form a superblock, which includes at least one block from each plane of each logical unit. Programming operations with respect to the memory device can be performed by superblocks, i.e., by writing the host data to the pages of one superblock after writing the host data to the pages of another superblock.

The memory subsystem controller can store the host data in a fault tolerant manner, by writing the host data sequentially to one page after another, such that the pages are grouped into fault tolerant stripes. Each fault tolerant stripe can include a certain number of data pages (i.e., pages that store host data) and a redundancy metadata page that stores the metadata to be used for error detection and recovery. As noted herein above, the redundancy metadata can be represented by parity metadata, such that each bit of the metadata page of a fault tolerant stripe can be produced by performing bitwise exclusive disjunction (also referred to as "XOR") operation of respective bits of data pages of the fault tolerant stripe. Such a redundancy scheme would provide fault tolerance in situations when no more than one page of a given fault tolerant stripe is faulty. The faulty page can be reconstructed by performing bitwise exclusive disjunction of all remaining data pages and the metadata page.

Since the above-described fault tolerant scheme allows for no more than one faulty page per fault tolerant stripe, no pages sharing one or more adjacent wordlines within a single plane of any given logical unit can be present in a fault tolerant stripe, since the presence of one faulty page on a given wordline can be indicative of other pages on the same wordline being also faulty. In other words, no more than one page from any given wordline of any given plane of a logical unit can be present in a fault tolerant stripe. Thus, in some implementations, a fault tolerant stripe can include a page from each logical unit of the memory device or, if each logical unit includes multiple planes, from each plane of each logical unit of the memory device, such that all but one pages of the fault tolerant stripe are utilized to store the host data, while the remaining page is utilized to store the redundancy metadata. In other implementations, all pages of the fault tolerant stripe are utilized to store the host data, while redundancy metadata is stored in a portion of each page, or elsewhere in the memory sub-system.

FIG. 3A schematically illustrates an example diagonal page mapping 300A of a memory device, in accordance with embodiments of the present disclosure. In the illustrative example of FIG. 3A, a diagonal stripe is formed by pages 310 having page numbers that differ by an offset value of 4 pages. Four logical units 302A-D are shown. Each logical unit 302 can be, for example, a die in the memory device. Four blocks 306A-D are shown, one of which is stored on each logical unit 302. Block 306A is named "Block A" and has an associated block #0. Block 306B is named "Block B" and has an associated block #1. Block 306C is named "Block C" and as an associated block number 2. Block 306D is named "Block D" and has an associated block number 3. Four wordlines 314A-314D are shown. Each wordline 314 includes four pages 310 per block 306. Since each wordline has four blocks and there are four wordlines, 16 pages per block 306 are shown. The pages of each block 306 are numbered Page 0 through Page 15. The pages of wordline 0 are numbered Page 0 through Page 3. Each block has the same page numbers, so a particular page can be identified by its page number and block name (or block number). A diagonal stripe can be a set of two or more pages in which at least two of the pages are associated with different wordlines. A diagonal stripe can also be referred to as a fault-tolerant stripe. A diagonal page mapping can include one or more diagonal stripes. A diagonal page mapping can also be referred to as a fault-tolerant page mapping.

The diagonal stripe shown in FIG. 3A includes four pages 310, each of which is on a different wordline 314. The pages 310 include a first page 310A (Page 0 of Block A), a second page 310B (Page 4 of Block B), a third page 310C (Page 8 of Block C), and a fourth page 310D (Page 12 of Block D). The stripe starts at page 0 of Block A, and the page number of each subsequent page of the stripe increases by the offset value of 4 pages. Further, a host data item is stored in each page 310. A host data item #0 is stored in page 310A, a host data item #1 is stored in page 310B, a host data item #2 is stored in page 310C, and a host data item #3 is stored in page 310D. Each page 310 of the fault tolerant stripe is on a different wordline 314. The first page 310A is on wordline #0 314A, the second page 310B is on wordline #1 314B, the third page 310C is on wordline #2 314C, and the fourth page 310D is on wordline #3 314D. The number of pages per wordline in the illustrative example of FIG. 3 is 4. Thus, an offset value of 4 or an integer multiple of 4 (e.g., 8, 12, . . . ) can be used to place each page of the stripe on a different wordline.

The numbers of logical units, pages, wordlines, and fault tolerant stripes, and the offset value in the illustrative example of FIG. 3A are chosen for illustrative purposes and are not limiting; other implementations can use various other numbers of logical units, pages, and fault tolerant stripes, and other offset values. Although not shown in FIG. 3A, the pages of each logical unit can be located on two or more planes of each logical unit.

In the illustrative example of FIG. 3A, the fault tolerant stripe is the first stripe programmed in the storage device. The pages 310A, 310B, 310C, 310D of the stripe can be programmed at substantially the same time. The stripe begins at page 0 of block A, and continues at a second page, which is page 4 of block B. Thus, pages 0-3 of block B are unused. If the memory device requires that each page of a block be programmed with data, then any suitable data can be used to program pages 0-3 of block B when programming page 4 (and other pages of block B, if required by the memory device). Similarly, since the third page of the stripe is page 8 of block C, pages 0-7 of block C are unused, and since the fourth page of the stripe is page 12 of block D, pages 0-11 of block D are unused. The unused pages that precede the stripe's pages ordinarily occur only on the first blocks of the logical units 302 (e.g., blocks B-D), since subsequently-programmed stripes can use each page of the next blocks (e.g., blocks E-H), as shown in FIG. 3B.

FIG. 3B schematically illustrates an example diagonal page mapping 300B across multiple blocks of a memory device, in accordance with embodiments of the present disclosure. In the illustrative example of FIG. 3B, 32 fault tolerant stripes are shown. Each fault tolerant stripe includes four pages. In each fault tolerant stripe, the page numbers of successive pages in successive blocks increase by an offset value of 4, except in cases where the pages are on different horizontal superblocks. A first horizontal superblock is formed by Blocks A-D. A second horizontal superblock, formed by blocks E-H, is shown below the first horizontal superblock. The first horizontal superblock includes unused pages, as described above with respect to FIG. 3A. In the second horizontal superblock, however, all pages are used. The pages of subsequent horizontal superblocks (e.g., a third horizontal superblock that includes blocks I-L) can similarly be fully utilized.

Each stripe in the illustrative example of FIG. 3B is labeled with a stripe number. Since the page offset value is 4, successive pages of each stripe are separated by a logical distance of 4 pages. Stripe 0 is similar to the stripe described above with respect to FIG. 3A. Stripe 0 has been programmed with the first four data items received from the host, and includes page 0 of block A, page 4 of block B, page 8 of block C, and page 12 of block D. Each page of stripe 0 includes one of the first four data items. The fourth through eighth host data items are stored in stripe 1, which is shown as logically being below stripe 0 (though the physical layout of the pages is not necessarily the same as the illustrated logical layout). Stripe 1 begins at the second page of block A, which is page 1 of block A, and also includes page 5 of block B, page 9 of block C, and page 13 of block D. Each subsequent page number of stripe 1 differs from the previous page number of stripe 1 by the offset value of 4. Similarly, stripe 2 begins at page 2 of block A, and stripe 3 begins at page 3 of block A.

In each fault tolerant stripe of FIG. 3B, the page numbers of successive pages in successive blocks increase by an offset value of 4, except in cases where the pages are on different horizontal superblocks. If two pages of a stripe are on different horizontal superblocks, there can be a logical distance of 4 pages (the offset value) between the two pages, but page numbering starts at zero in the second horizontal superblock, so the numeric difference between the page numbers of the first and second pages can be less than 4.

Stripe 4, which begins at page 4 of block A, crosses onto the second horizontal superblock. Although the second and third pages of stripe 4 fit on the first horizontal superblock, at page 8 of block B and page 12 of block C, the fourth page does not. If the page number for the fourth page is determined by adding the offset value of 4 to page number 12 (of the third block), the result is 4+12=16, which is greater than the highest page number (in other words, equal to the number of pages per block). Thus, the fourth page of stripe 4 is page 0 of block H. Block H is the second block of logical unit 3 (LUN 3), and is in the second horizontal superblock shown in FIG. 3B, so the first three pages of stripe 4 are on the first horizontal superblock, and the fourth page of stripe 4 is on the second horizontal superblock. Stripes 5-15 similarly include pages on both horizontal superblocks.

Stripe 15 is the last stripe that begins on the first horizontal superblock. Stripe 16 begins on the second horizontal superblock, at page 0 of block E. Stripe 16 also includes page 4 on block F, page 8 on block G, and page 12 on block H. Stripes 17-19 fit on the second horizontal superblock. Stripes 20-31 cross onto the third horizontal superblock, not shown. For example, the third page of stripe 20 is at page 12 of block G, and the fourth page of stripe 20 is at page 0 of block L (now shown), as indicated by the arrow from page 12 of block G.

The numbers of logical units, pages, wordlines, superblocks, and fault tolerant stripes, and the offset value in the illustrative example of FIG. 3B are chosen for illustrative purposes and are not limiting; other implementations can use various other numbers of logical units, pages, wordlines, superblocks, and fault tolerant stripes, and other offset values.

FIG. 3C schematically illustrates example data items in an example diagonal page mapping 300C across multiple blocks of a memory device, in accordance with embodiments of the present disclosure. The illustrative example of FIG. 3C shows host data items stored in the pages of stripes 0-31. Each data item is labeled with a number and is stored in a page of the memory device. The data item numbers can correspond to the order in which the data items are received from the host. For example, data item 0, shown in page 0 of block A, is the first item received from the host in this example. Data item 1, shown in page 4 of block B, data item 2, shown in page 8 of block C, and data item 3, shown in page 12 of block D, are the second, third, and fourth data items received, respectively. Data items 0, 1, 2, and 3 form the first stripe, which is labeled stripe 0. Each stripe includes four host data items having four consecutive item numbers, which indicates that the four host data items of each stripe are received consecutively from the host. Since each stripe includes four data items, the first data item of each stripe has an item number equal to the stripe number multiplied by four.

The diagonal stripe manager 113 can generate the diagonal stripes shown in the illustrative example mapping 310C of FIG. 3C using the offset value to determine a page number for each received data item and storing each received data item at different logical unit in a page identified by the page number determined for the data item. The diagonal stripe manager 113 can process the host data items in a sequence, and determine a page number for and store each host data item in the sequence. As the diagonal stripe manager 113 processes the host data items, the particular host data item being processed at a particular time or iteration is referred to herein as a "current data item" and the particular page in which the current data item is stored is referred to herein as a "current page." The page that precedes the current page is referred to herein as the "previous page."

Thus, data items can be stored in each page of a stripe (the "current stripe") by storing a data item in a page of each of the logical units, such that the page number of each of the corresponding pages of the logical unit differs from a page number of each of the other pages of the logical unit by at least the offset value (e.g., each pair of page numbers on adjacent logical units differ by at least the offset number, where LUN 0 and LUN 1 are examples of adjacent logical units). Each data item is associated with a current stripe, which is the stripe that includes the page in which the data item is stored.

The page number at which each data item is stored is determined based on an offset from the previous page. For example, the current page number can be set to the previous page number plus the offset value. The current stripe can be closed when a page has been stored in each of the logical units of the memory device. A new stripe can be opened when the current stripe has been closed.

The diagonal stripe manager 113 can store each data item in a particular block of a logical unit. Each block can have space for up to a predetermined number of pages (e.g., the number of pages per block). The block number of the first page of the current stripe can be stored in a variable named FirstBlock. The value of FirstBlock can be updated to be the next block number in LUN 0 (or other designated first logical unit) when a new stripe is opened and there are no remaining free pages in the current block of LUN 0. A "current block" can be associated with each logical unit. The current block of a logical unit can have an initial value corresponding to the first block of the logical unit (e.g., Block A of LUN 0), and can be updated to correspond to the next block of the logical unit (e.g., Block E of LUN 0) when there are no remaining available pages in the current block of the logical unit (e.g., when a data item has been stored in each page of the current block of the logical unit). The next block of the logical unit (e.g., Block E) can be on a different horizontal superblock than the current block (e.g., Block A). Thus, in the example mapping 310C, Block A is on a first superblock that include Blocks A-D, and Block E is on a second superblock that includes blocks E-H.

To determine whether a stripe crosses horizontal superblocks, the diagonal stripe manager 113 can determine whether the current page number+offset is equal to (or greater than) the number of pages per block. If so, the current data item can be stored on the next block of the logical unit, and the page number in the next block can be determined by next page number=page number+offset modulo the number of pages per block. The next block can be in the next horizontal superblock. The block number of the next block after a block number b of a logical unit can be determined by adding the number of logical units to the block number b.

The diagonal stripe manager 113 can determine whether a new stripe starts on a different block (e.g., on the next horizontal superblock) and update the current page number and current block number accordingly. The first data item of the first stripe is stored at a first page of the first logical unit. For example, as shown in FIG. 3C, data item 0 of stripe 0 is stored at page 0 of Block A of LUN 0. The first page of each subsequent stripe begins at a subsequent page of the first logical unit. Thus, for example, data item 4 of stripe 1 is stored at page 1 of Block A of LUN 0. If there are more data items than will fit in a single block of the first logical unit, then the data items can be stored in multiple blocks. If each page of the first logical unit is occupied by a data item, then the next stripe begins in the next block of the first logical unit. That is, the first page of the next block is stored in the next horizontal superblock. For example, after data item 60 has been stored in page 15 of stripe 15 of Block A, no further space is available to store another data item in block A. Thus, the next stripe (stripe 16) begins at block E, which is in the second horizontal superblock shown in FIG. 3C. The first data item of stripe 16 is data item 64, and is stored at page 0 of Block E in logical unit 0. The remaining three data items of stripe 16 are stored at blocks F, G, and H, respectively, in respective logical units 1, 2, and 3.

The numbers of logical units, pages, wordlines, and fault tolerant stripes, and the offset value in the illustrative example of FIG. 3C are chosen for illustrative purposes and are not limiting; other implementations can use various other numbers of logical units, pages, and fault tolerant stripes, and other offset values.

FIG. 4 schematically illustrates another example diagonal page mapping across multiple blocks of a memory device, in accordance with embodiments of the present disclosure. The illustrative example of FIG. 4 is similar to that of FIG. 3B, but the page offset value is 8 in FIG. 4 (instead of 4 in FIG. 3B). In the illustrative example of FIG. 4, 6 fault tolerant stripes are shown. Some pages, such as pages 6-15 of block A, are omitted from FIG. 3B for clarity.

In each fault tolerant stripe of FIG. 4, the page numbers of successive pages in successive blocks increase by an offset value of 8, except in cases where the pages are on different horizontal superblocks. If two pages of a stripe are on different horizontal superblocks, there can be a logical distance of 8 pages (the offset value) between the two pages, but page numbering starts at zero in the second horizontal superblock, so the numeric difference between the page numbers of the first and second pages can be less than 8.

Each stripe in the illustrative example of FIG. 4 is labeled with a stripe number. Since the page offset value is 8, successive pages of each stripe are separated by a logical distance of 8 pages. Stripe 0 has been programmed with the first four data items received from the host, and includes page 0 of block A, page 8 of block B, page 0 of block G (in the second horizontal superblock), and page 8 of block H (in the second horizontal superblock). Each page of stripe 0 includes one of the first four data items. The fourth through eighth host data items are stored in stripe 1. Stripe 1 begins at the second page of block A, which is page 1 of block A, and also includes page 9 of block B, page 1 of block G, and page 9 of block H. Four more stripes, numbered 2-5, are also shown, and follow the same pattern. The numbers of logical units, pages, wordlines, and fault tolerant stripes, and the offset value in the illustrative example of FIG. 4 are chosen for illustrative purposes and are not limiting; other implementations can use various other numbers of logical units, pages, and fault tolerant stripes, and other offset values.

FIG. 5 is a flow diagram of an example method 500 of diagonal page mapping by a memory sub-system controller operating in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the diagonal stripe manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device receives multiple host data items including a first host data item and a second host data item that consecutively follows the first host data item according to an order in which the host data items are received. At operation 520, the processing device stores the first host data item in a first page of a first logical unit of the memory device, wherein the first page is associated with a first page number. At operation 530, the processing device determines a second page number for the second host data item, wherein the second page number is determined based on an offset value that corresponds to a number of pages per wordline of the memory device. At operation 540, the processing device identifies a second logical unit of the memory device. At operation 550, the processing device stores the second host data item in a second page of the second logical unit, wherein the second page is identified by the second page number, and the first page and the second page are associated with a fault-tolerant stripe.

Figure 6:
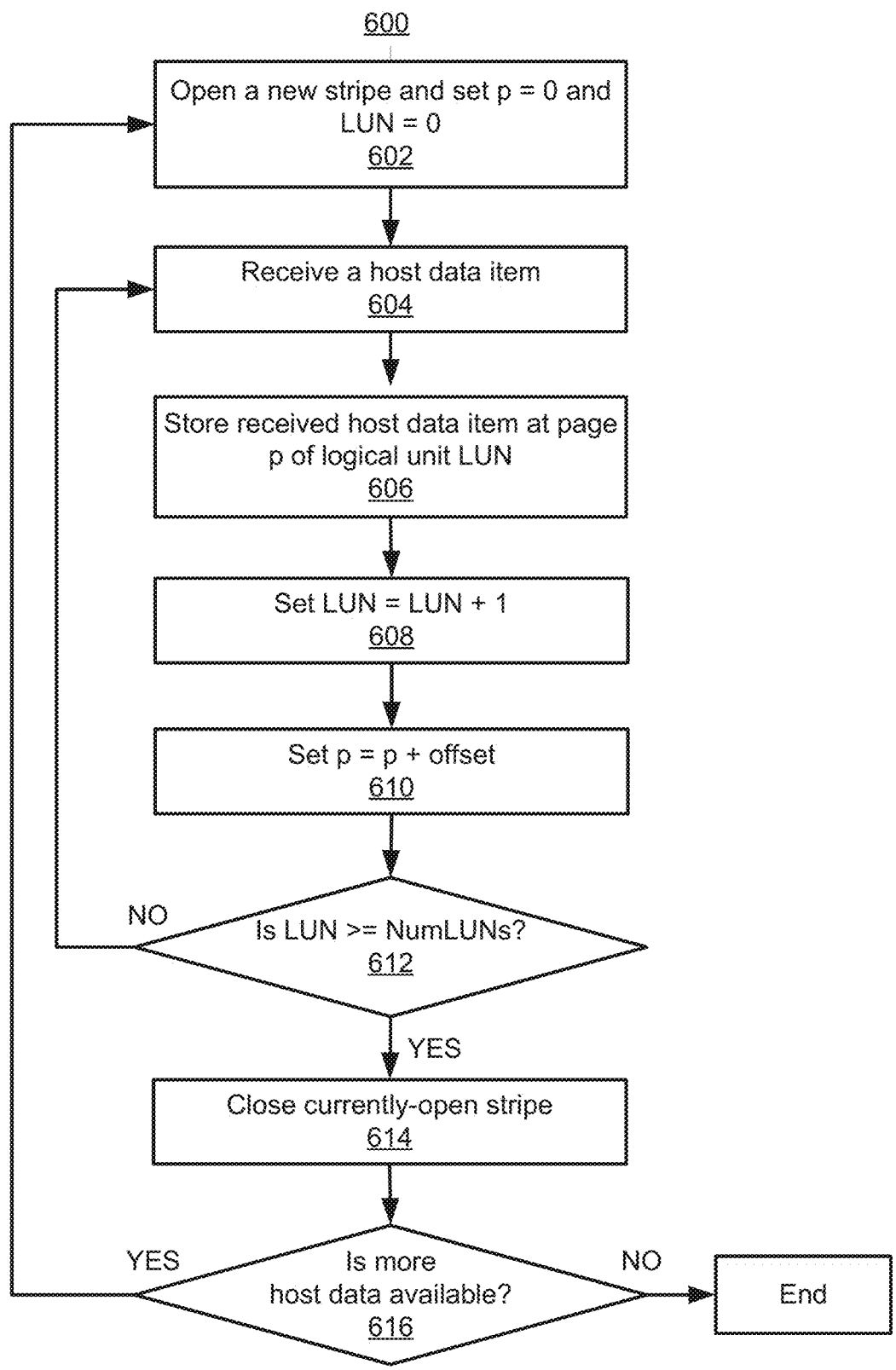
FIG. 6 is a flow diagram of an example method of implementing diagonal page mapping by a memory sub-system controller operating in accordance with some embodiments of the present disclosure.

FIG. 6 is a flow diagram of an example method 600 of implementing diagonal page mapping by a memory subsystem controller operating in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the diagonal stripe manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing device opens a new stripe on the memory device and sets a variable "p", which represents a current page number, to an initial value of 0 and a variable "LUN" to an initial value of 0. At operation 602, the processing device also sets a variable "LUN", which represents a current logical unit number, to 0. Other initial values can be used as appropriate. At operation 604, the processing device receives a host data item from a host system 120. The host data item can be data to be stored on a memory device. At operation 606, the processing device stores the received host data item at page p of the logical unit identified by the variable LUN. At operation 608, the processing device increments LUN by setting the value of LUN to LUN+1. At operation 610, the processing device sets the value of p to p+offset, where offset is the offset value (e.g., an integer multiple of the number of pages in a wordline, such as 4, 8, and so on).

At operation 612, the processing device determines whether LUN is greater than or equal to NumLUNs, where NumLUNs is the number of LUNs in the memory device (e.g., 4 or other value). If LUN is less than NumLUNs, then operation 612 causes the processing device to perform operation 604 and subsequent operations again. If LUN is greater than or equal to NumLUNs, then operation 612 causes the processing device to perform operation 614. At operation 614, the processing device closes the currently-open stripe. At operation 616, the processing device determines whether there is more host data available to read. If so, operation 616 causes the processing device to perform operation 602 and subsequent operations again. If there is no more host data available to read, the method 600 ends after operation 616.

Figure 7:
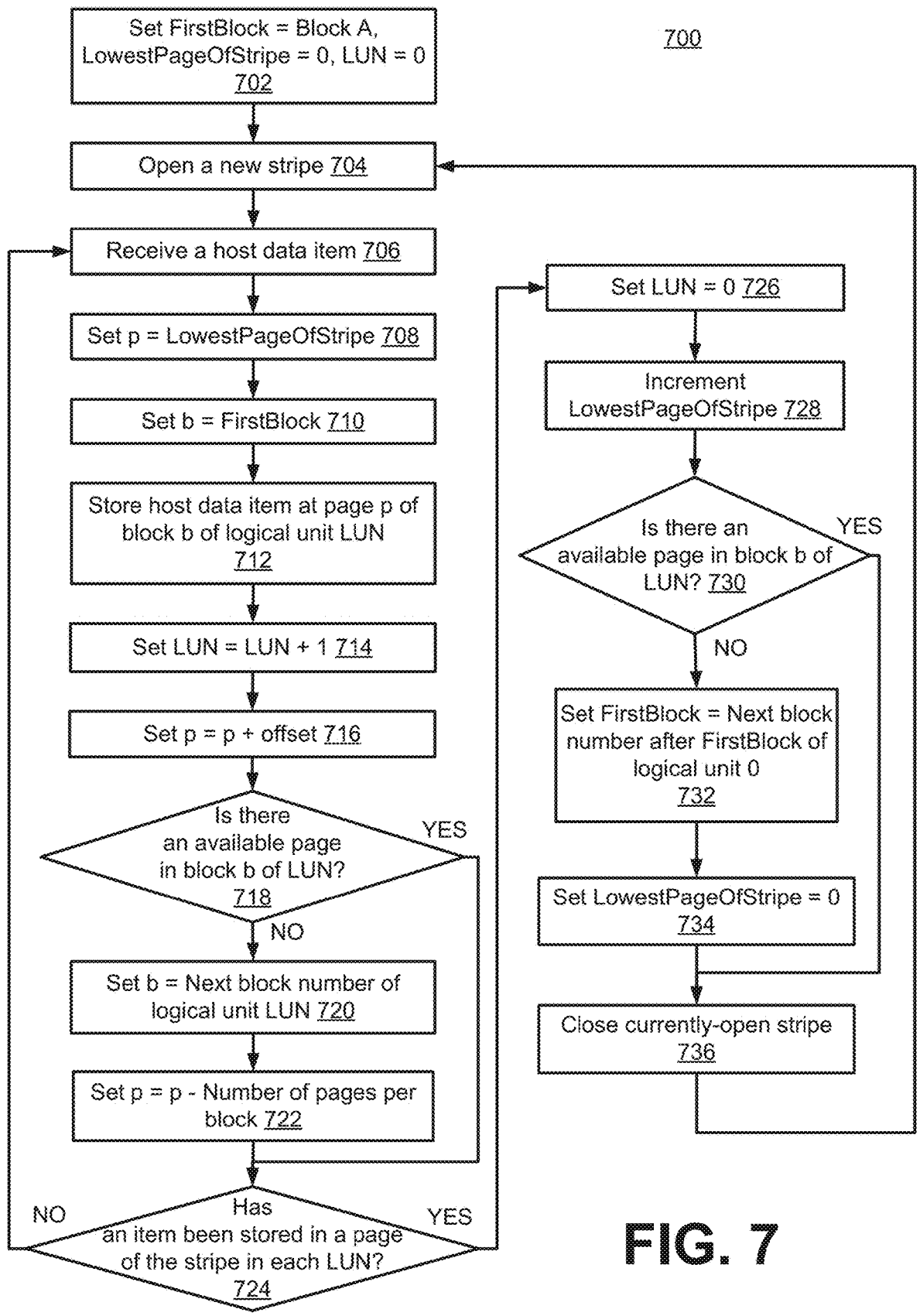
FIG. 7 is a flow diagram of an example method of implementing diagonal page mapping across multiple blocks by a memory sub-system controller operating in accordance with some embodiments of the present disclosure.

FIG. 7 is a flow diagram 700 of an example method of implementing diagonal page mapping across multiple blocks by a memory sub-system controller operating in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the diagonal stripe manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 702, the processing device sets variables "FirstBlock", "LowestPageOfStripe", and "LUN" to initial values. FirstBlock indicates the block number of the first page of the current stripe. For example, FirstBlock is 0 (block A) for stripe 0 of FIG. 3C, since the first page of the stripe, which stores data item 0, is at page 0 of block A. LowestPageOfStripe indicates the page number of the first page of the current stripe. For example, LowestPageOfStripe is 0 for stripe 0 of FIG. 3C, since the first page of the stripe is at page 0 of block A. The initial value of FirstBlock is 0 (block A), the initial value of LowestPageOfStripe is 0, and the initial value of LUN is 0. Other initial values can be used as appropriate.

At operation 704, the processing device opens a new stripe. The stripe can be a fault-tolerant stripe associated with redundancy metadata. At operation 706, the processing device receives a host data item from a host system 120. At operation 708, the processing device sets a variable "p" representing the current page to the value of LowestPageOfStripe. At operation 710, the processing device sets a variable "b" representing the current block to the value of FirstBlock. At operation 712, the processing device stores the received host data item at page p of block b of logical unit LUN. At operation 714, the processing device sets LUN to the value of LUN+1.

Although not shown (for reasons of illustrative clarity), if a data item has been stored in a page of the stripe in each LUN (e.g., LUN is equal to or greater than NumLUNs) when operation 714 is performed, then the processing device can continue execution of the method at operation 726 (e.g., without executing operations 716-724), since there is no need to update the values of b and p. Each page of the current stripe has been processed at this point in execution. If there are more data items to process, the values of b and p will be changed to correspond to the first page of the next stripe when the processing device next performs operations 708 and 710. Thus, although not shown, between blocks 714 and 716, the processing device can determine whether LUN is equal to (or greater than) the number of LUNs in the memory device (NumLUNs) and if so, continue execution at operation 726.

At operation 716, the processing device sets p to p+offset to change the current page, at which the next data item in the stripe (if any) is to be stored, by the offset number of pages. At operation 718, the processing device determines whether there is an available page in block b of LUN in which to store another data item. For example, operation 718 determines whether p is equal to (or greater than) the number of pages per block. If so, the processing device can continue execution at operation 724. If not, at operation 720, the processing device sets b to the next block number of logical unit LUN. The next block number can be, for example, b+NumLUNs if there is a block number of each LUN (as is the case in the example of FIG. 3B). At operation 722, the processing device sets p to p−the number of pages per block.

At operation 724, the processing device determines whether a data item has been stored in a page of the stripe in each LUN. A data item has been stored in a page of the stripe in each LUN if LUN is equal to or greater than NumLUNs. If so, then there are no further data items to store for the current stripe. At operation 726, the processing device sets LUN=0 in preparation to store another stripe. At operation 728, the processing device increments LowestPageOfStripe, which represents the first page of the current stripe (unless the current block is full).

At operation 730, the processing device determines whether there is there an available page in block b of LUN (in other words, whether the current block is full). If there is not an available page in block b of LUN, then at operation 732, the processing device sets FirstBlock to the next block number after FirstBlock of logical unit 0. The next block number can be FirstBlock+NumLUNs, for example. At operation 734, the processing device set LowestPageOfStripe to 0, since page numbers restart at zero on the next block. Otherwise if at operation 730 the processing device determines that there is there an available page in block b of LUN, then the processing device does not perform operations 732 and 734.

At operation 736, the processing device closes the currently-open stripe. Operation 736 can also store redundancy metadata for currently open stripe. For example, the metadata can be stored in one of the pages of the current stripe (e.g., the last page). If metadata is stored in the last page of each stripe, then at operations 718 and 724 the processing device can determine that there is not an available page when only one page is available (e.g., LUN=LUN−1), and operation 736 (or other operation of the method 700) can generate the redundancy metadata based on the pages of the stripe and store the redundancy metadata in the last page of the stripe. After operation 736, the processing device performs operation 704 again.

Figure 8:
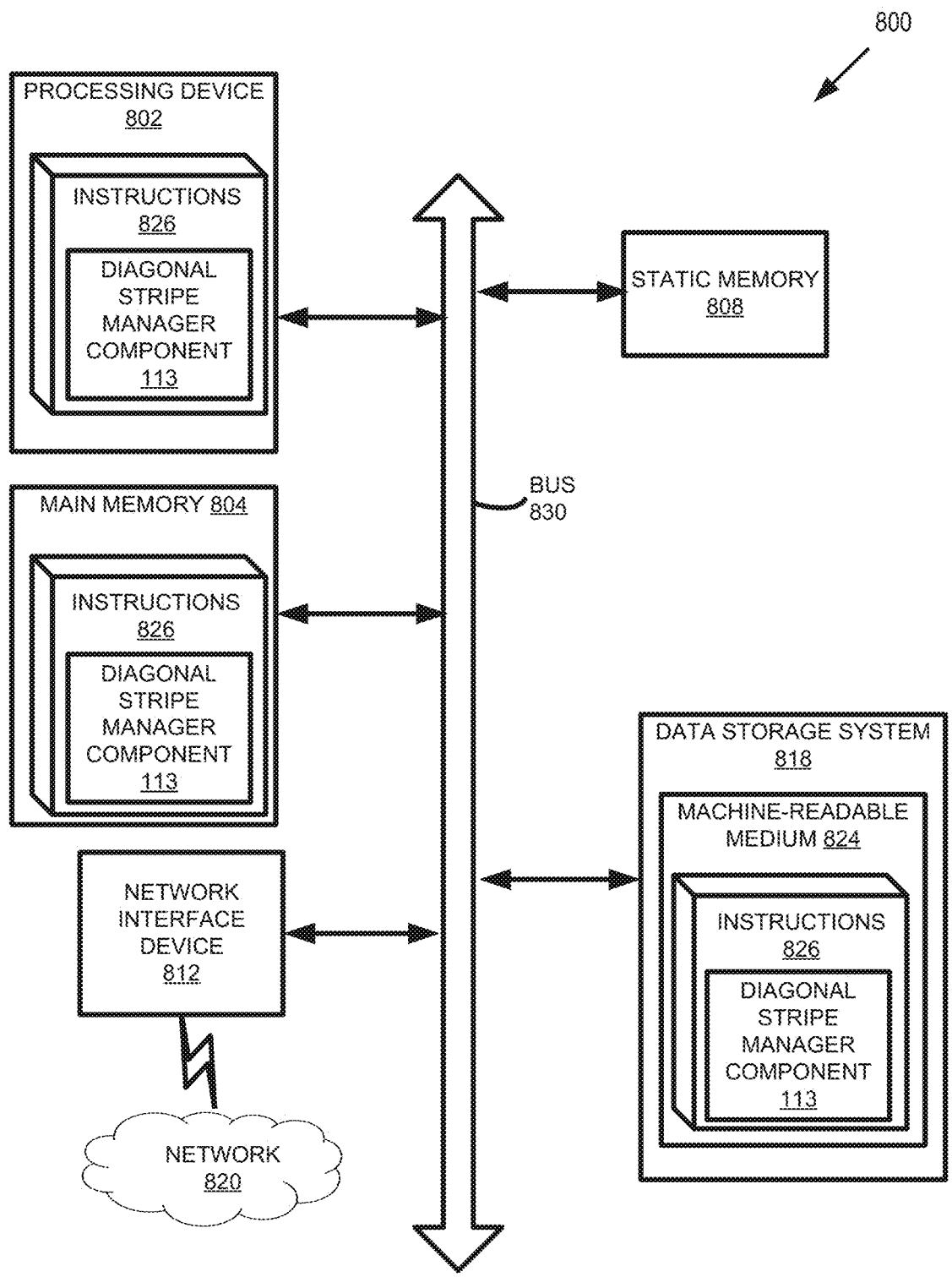
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the diagonal strip manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 808 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 812 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a diagonal stripe manager component (e.g., the diagonal stripe manager component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   receiving a plurality of host data items comprising a first host data item and a second host data item that consecutively follows the first host data item according to an order in which the host data items are received;
   storing the first host data item in a first page of a first logical unit of the memory device, wherein the first page is associated with a first page number;
   determining a second page number for the second host data item, wherein the second page number is determined based on an offset value that corresponds to a number of pages per wordline of the memory device;
   identifying a second logical unit of the memory device; and
   storing the second host data item in a second page of the second logical unit, wherein the second page is identified by the second page number, and wherein the first page and the second page are associated with a fault-tolerant stripe.

2. The system of claim 1, wherein the second page of the second logical unit is associated with a different wordline than the first page of the first logical unit.

3. The system of claim 1, wherein the first page is in a first block of the first logical unit, the first block is associated with a first block number, and determining the second page number for the second host data item comprises:
   determining a second block number of the second logical unit,
   wherein the second page number is in a second block of the second logical unit, and the second block is identified by the second block number.

4. The system of claim 3, wherein determining the second block number of the second logical unit comprises:
   determining whether there is an available page in a current block of the second logical unit in which to store the second block;
   responsive to determining that there is not an available page in the current block of the second logical unit:
   determining the second block number as a next block number after a current block number of the current block in the second logical unit,
   determining a sum of the first page number and the offset value, and
   setting the second page number to a difference between the sum and a number of pages per block of the memory device.

5. The system of claim 4, wherein determining whether there is an available page in the current block of the second logical unit in which to store the second block is based on a comparison of a sum of the first page number and the offset value to a number of pages per block of the memory device.

6. The system of claim 3, wherein determining the second page number for the second host data item further comprises:
   determining whether a data item has been stored in a page associated with the fault tolerant stripe in each logical unit of the memory device;
   responsive to determining that a data item has been stored in a page associated with the fault tolerant stripe in each logical unit of the memory device:
   closing the fault tolerant stripe,
   opening the fault tolerant stripe, wherein the fault tolerant stripe is associated with a lowest page number that identifies a page of a logical unit in which a first page of the fault tolerant stripe is stored, and
   determining the lowest page number of the fault tolerant stripe,
   wherein a first page of the fault tolerant stripe corresponds to the determined lowest page number, wherein subsequent values of the first page number and the second page number are determined based on the lowest page number of the fault-tolerant stripe.

7. The system of claim 6, wherein determining the lowest page number of the fault tolerant stripe comprises:
   determining whether there is an available page in a current block of the second logical unit in which to store the second block;

responsive to determining that there is an available page in the current block of the second logical unit in which to store the second block, incrementing the lowest page number of the fault tolerant stripe;

responsive to determining that there is not an available page in the current block of the second logical unit in which to store the second block:
  determining the second block number as a next block number after a current block number of a logical unit in which a first page of the fault tolerant stripe is stored, and
  setting the lowest page number of the fault tolerant stripe to zero.

8. The system of claim 7, wherein the logical unit in which a first page of the fault tolerant stripe is stored is a lowest-numbered logical unit of the memory device.

9. The system of claim 6, wherein determining whether a data item has been stored in a page associated with the fault tolerant stripe in each logical unit of the memory device comprises comparing a logical unit counter to a number of logical units in the memory device.

10. The system of claim 1, wherein the first page number corresponds to a location of the first page in the first logical unit, and the second page number corresponds to a location of the second page in the second logical unit.

11. The system of claim 1, wherein the second logical unit is associated with a logical unit number that is a next logical unit number after a logical unit number of the first logical unit according to an ordering of logical units in the memory device.

12. The system of claim 1, wherein the offset value is based on a multiple of the number of pages per wordline of the memory device.

13. A non-transitory computer-readable storage medium comprising instructions that, when executed by a processing device, cause the processing device to perform operations comprising:
  receiving a plurality of host data items comprising a first host data item and a second host data item that consecutively follows the first host data item according to an order in which the host data items are received;
  storing the first host data item in a first page of a first logical unit of a memory device, wherein the first page is associated with a first page number;
  determining a second page number for the second host data item, wherein the second page number is determined based on an offset value that corresponds to a number of pages per wordline of the memory device;
  identifying a second logical unit of the memory device; and
  storing the second host data item in a second page of the second logical unit, wherein the second page is identified by the second page number, wherein the first page and the second page are associated with a fault-tolerant stripe.

14. The computer-readable storage medium of claim 13, wherein the second page of the second logical unit is on a different wordline than the first page of the first logical unit.

15. The computer-readable storage medium of claim 13, wherein the first page is in a first block of the first logical unit, the first block is associated with a first block number, and determining the second page number for the second host data item comprises:
  determining a second block number of the second logical unit,
  wherein the second page number is in a second block of the second logical unit, and the second block is identified by the second block number.

16. The computer-readable storage medium of claim 15, wherein determining the second block number of the second logical unit comprises:
  determining whether there is an available page in a current block of the second logical unit in which to store the second block;
  responsive to determining that there is not an available page in the current block of the second logical unit:
    determining the second block number as a next block number after a current block number of the current block in the second logical unit,
    determining a sum of the first page number and the offset value, and
    setting the second page number to a difference between the sum and a number of pages per block of the memory device.

17. The computer-readable storage medium of claim 16, wherein determining whether there is an available page in the current block of the second logical unit in which to store the second block is based on a comparison of a sum of the first page number and the offset value to a number of pages per block of the memory device.

18. A method comprising:
  receiving a first host data item;
  storing the first host data item in a first page of a first logical unit of s memory device, wherein the first page is associated with a fault tolerant stripe;
  receiving a second host data item;
  identifying, based on the first page and a page offset, a second page of a second logical unit of the memory device, wherein the second page is associated with the fault tolerant stripe, and the first page and the second page are at different wordlines of the memory device; and
  storing the second host data item in the second page of the second logical unit of the memory device.

19. The method of claim 18, wherein the page offset is based on a number of pages in a wordline of the memory device.

20. The method of claim 18, wherein the first page is associated with a first page number and the second page is associated with a second page number, the method further comprising:
  determining the second page number based on a sum of the page offset and the first page number.

* * * * *